United States Patent [19]

Adamson

[11] 4,067,367
[45] Jan. 10, 1978

[54] TREE DELIMBER

[76] Inventor: Milam Adamson, Rte. 2, Roanoke, Ala. 36274

[21] Appl. No.: 783,958

[22] Filed: Apr. 1, 1977

[51] Int. Cl.² .............................................. B27L 1/06
[52] U.S. Cl. ................................................... 144/2 Z
[58] Field of Search .............................. 144/2 Z, 3 D

[56] References Cited
U.S. PATENT DOCUMENTS

| 3,529,639 | 9/1970 | Herof | 144/2 Z |
| 3,809,134 | 5/1974 | McCabe | 144/3 D X |

Primary Examiner—Travis S. McGehee

[57] ABSTRACT

A delimber for stripping limbs from fallen trees; and which consists of a welded frame made of pipes, the frames standing up-right, so that fallen trees can be pulled through square openings formed between the pipes, and as the tree trunk is pulled through one of the openings, the limbs and branches of the tree, unable to crawl through the square opening in the frame are obliged to snap off, thus quickly and easily preparing the tree trunk into a log.

3 Claims, 4 Drawing Figures

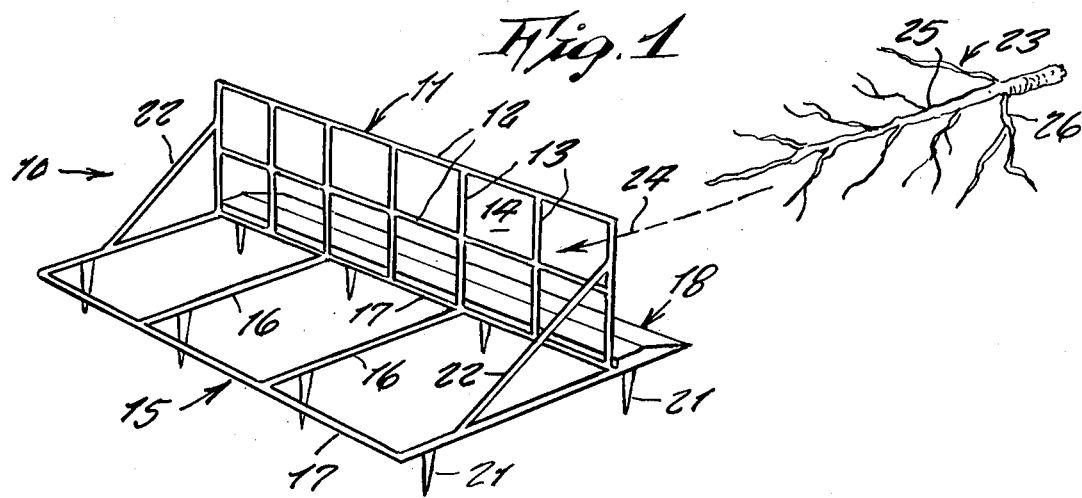
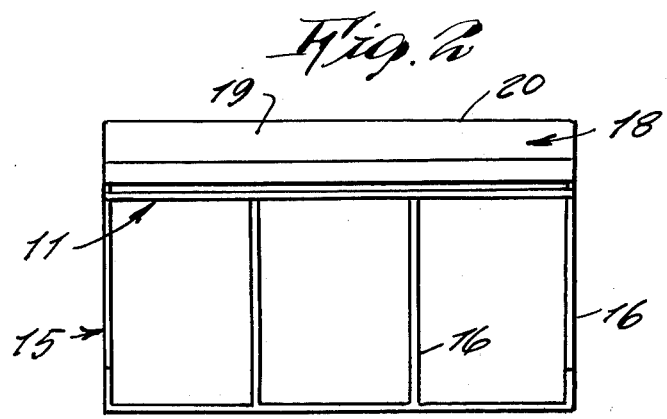
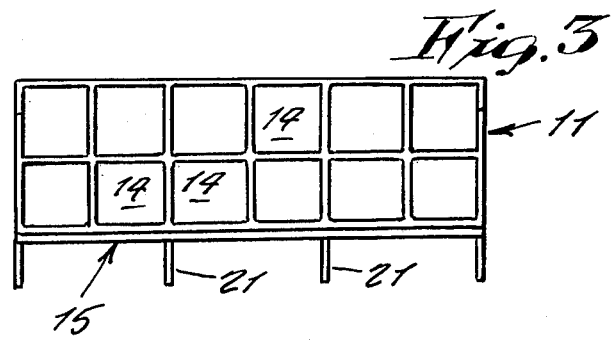
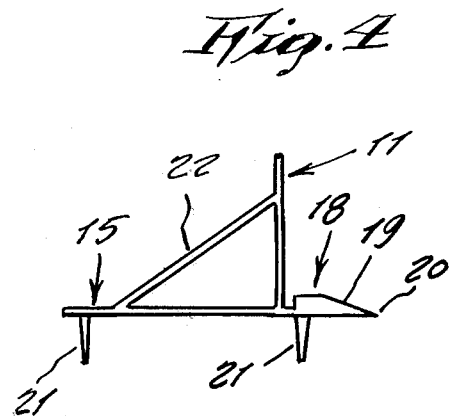

TREE DELIMBER

This invention relates generally to logging machinery.

A principal object of the present invention is to provide a tree delimber apparatus for use in woods, where timber is being logged, and which quickly and easily removes limbs and branches from tree trunks, so that the tree trunks can then be handled as logs.

Another object of the present invention is to provide a tree delimber, which has no moving parts to break down, or which needs servicing, the tree delimber being readily transported into an area where trees are being felled, and which, with minimum effort, quickly delimbs the fallen trees.

Yet a further object is to provide a tree delimber, which can be made in any of various sizes, so as to handle different sizes of trees.

Still a further object is to provide a tree delimber, which can be quickly and easily anchored at any place in a ground, so as to be stationary in use, and which therefore does not depend on being braced between existing upright trees.

Other objects are to provide a tree delimber, which is simple in design, inexpensive to manufacture, rugged in construction, easy to use and efficient in operation.

These, and other objects, will be readily evident upon a study of the following specification, and the accompanying drawing, wherein:

FIG. 1 is a perspective view of the present invention, shown in operative use;

FIG. 2 is a top plan view thereof;

FIG. 3 is a rear elevation view thereof; and

FIG. 4 is a side elevation thereof.

Referring now to the drawing in greater detail, the reference numeral 10 represents a tree delimber, according to the present invention, which includes a vertical upright frame 11, made of pipes that are rigidly welded together, and which, accordingly, includes horizontally extending pipes 12 and vertically extending pipes 13, so as to form a plurality of square spaces 14.

The tree delimber 10 also includes a horizontally extending frame 15, made, likewise, of welded pipes wherein parallel, longitudinally extending pipes 16 are welded at their opposite ends to transverse extending pipes 17.

Upon a forward end of the horizontal frame 15, there is welded a transverse extending deflector 18, which may be made of steel plate, the forward end of the deflector tapering downwardly with a forwardly declined upper surface 19, which terminates at a terminal forward edge 20, that rests upon a ground when the tree delimber is in use.

A plurality of eight spikes 21, made of steel are welded to the horizontal frame 15, the spikes being downwardly tapered, and extending from the underside of the frame, so that the spikes can be readily inserted into a ground and thus anchor the tree delimber in a stationary position, when in use.

At each opposite side end of the tree delimber, there is an angularly extending brace 22, which extends between an upper portion of the frame 11 and a rear portion of the horizontal frame 15. The braces serve to support the frame 11 upright in a strong manner, so as to resist a force of a tree 23, that is being pulled through the frame 11, in a direction as indicated by the arrow 24.

In operative use, the tree delimber is stationarily placed in a forest where logging is undertaken, by pushing the spikes 21 down into a ground with a skider blade. In such position, the frame 15 rests horizontally upon the surface of the ground, so that the edge 20 of the deflector is level with the ground. Fallen trees 23 are then pulled by cable through the openings 14 in the frame 11, with the upper end of the tree being pulled forwardly. Thus, as the tree trunk 25 is passed through the opening 14, the tree limbs or branches 26, striking against the steel pipes of the frame, will snap off, leaving only the trunk 25 to pass through the opening 14. Thus, the tree 23 is delimbed. It will be noted that the deflector serves to prevent the tree from getting underneath the tree delimber, and forces it to ride upwardly on top of the deflector, and into the frame.

Thus, there is provided a tree delimber, that quickly and efficiently accomplishes the task, which otherwise would require considerable time, for a logger, working with an ax, to individually remove the separate branches and limbs from the tree trunk.

While various changes may be made in the detail construction, it is understood that such changes will be within the spirit and scope of the present invention, as is defined by the appended claims.

What I now claim is:

1. A tree delimber, comprising, in combination, an upright frame and a horizontal frame, said upright frame being supported vertically upon said horizontal frame, and said vertical frame incorporating means whereby a fallen tree, pulled through said vertical frame, is delimbed; said vertical frame being comprised of a plurality of vertical and horizontal pipes welded together and forming a plurality of square openings, said trees being pulled through said openings; said horizontal frame being comprised of a plurality of parallel, longitudinally extending pipes and a plurality of transverse extending pipes welded together, together with a deflector, and means for anchoring said horizontal frame in a stationary position upon a ground.

2. The combination as set forth in claim 1, wherein said anchoring means comprises a plurality of spikes insertable into said ground.

3. The combination as set forth in claim 2, wherein a plurality of braces between said vertical and said horizontal frame rigidly secure said vertical frame against a force of a tree being pulled therethrough.

* * * * *